US007925437B2

(12) United States Patent
Pinkus et al.

(10) Patent No.: US 7,925,437 B2
(45) Date of Patent: Apr. 12, 2011

(54) NAVIGATION DEVICE WITH TOUCH SCREEN

(75) Inventors: Ayal Pinkus, Amsterdam (NL); Edwin Neef, Amsterdam (NL); Sven-Erik Jurgens, Amsterdam (NL); Mark Gretton, London (GB)

(73) Assignee: TomTom International B.V., Amsterdam (NL)

( * ) Notice: Subject to any disclaimer, the term of this patent is extended or adjusted under 35 U.S.C. 154(b) by 516 days.

(21) Appl. No.: 11/276,547

(22) Filed: Mar. 6, 2006

(65) Prior Publication Data

US 2006/0173615 A1 Aug. 3, 2006

(51) Int. Cl.
*G01C 21/32* (2006.01)
(52) U.S. Cl. ........ 701/211; 701/207; 701/208; 701/209; 701/36; 345/168; 345/169; 345/172; 345/173; 340/995.14
(58) Field of Classification Search .................. 345/173, 345/168, 169, 172; 701/207, 211, 208, 209, 701/36
See application file for complete search history.

(56) References Cited

U.S. PATENT DOCUMENTS

| | | | |
|---|---|---|---|
| 4,281,323 A | 7/1981 | Burnett et al. | |
| 5,410,485 A | 4/1995 | Ichikawa | |
| 5,452,217 A | 9/1995 | Kishi et al. | |
| 5,487,616 A * | 1/1996 | Ichbiah | 400/489 |
| 5,528,248 A | 6/1996 | Steiner et al. | |
| 5,652,706 A | 7/1997 | Morimoto et al. | |
| 5,731,979 A | 3/1998 | Yano et al. | |
| 5,841,849 A * | 11/1998 | Macor | 379/142.17 |
| 5,859,628 A * | 1/1999 | Ross et al. | 345/173 |
| 5,920,303 A * | 7/1999 | Baker et al. | 345/172 |
| 5,928,307 A | 7/1999 | Oshizawa et al. | |
| 5,999,892 A | 12/1999 | Fan | |
| 6,040,824 A | 3/2000 | Maekawa et al. | |
| 6,115,669 A * | 9/2000 | Watanabe et al. | 701/209 |
| 6,157,379 A | 12/2000 | Singh | |
| 6,208,344 B1 | 3/2001 | Holzman et al. | |
| 6,295,372 B1 * | 9/2001 | Hawkins et al. | 382/187 |
| 6,297,811 B1 | 10/2001 | Kent et al. | |
| 6,317,687 B1 | 11/2001 | Morimoto et al. | |

(Continued)

FOREIGN PATENT DOCUMENTS

DE 19527485 8/1996

(Continued)

OTHER PUBLICATIONS

Brighthand.com Forums: Virtual Keyboard, various authors http://forum.brighthand.com/tungsten-t-series/55506-t3-virtual-qwerty-keyboard.html, Jul. 2003.*

(Continued)

*Primary Examiner* — Thomas G Black
*Assistant Examiner* — Wae Louie
(74) *Attorney, Agent, or Firm* — Harness, Dickey & Pierce, P.L.C.

(57) ABSTRACT

A navigation device programmed with a map database and software that enables a route to be planned between two user-defined places. The device may be further programmed to be able to display on a touch sensitive display a main navigation mode screen showing a map and to allow a user to input destination address information using a virtual keyboard whose keys are sized to allow reliable finger activation. The device is especially advantageous for an in-car navigation device since it allows the user to easily and reliably input address information, even whilst the device is mounted in a vehicle.

27 Claims, 4 Drawing Sheets

U.S. PATENT DOCUMENTS

| | | | |
|---|---|---|---|
| 6,321,158 B1 | 11/2001 | DeLorme et al. | |
| 6,336,072 B1 | 1/2002 | Takayama et al. | |
| 6,381,534 B2 | 4/2002 | Takayama et al. | |
| 6,397,148 B1 | 5/2002 | Lee | |
| 6,405,126 B1 | 6/2002 | Palomo | |
| 6,411,283 B1 | 6/2002 | Murphy | |
| 6,484,094 B1 | 11/2002 | Wako | |
| 6,507,333 B1 | 1/2003 | Mikkelsen, Jr. et al. | |
| 6,542,812 B1* | 4/2003 | Obradovich et al. | 701/207 |
| 6,546,335 B1 | 4/2003 | Tompkins et al. | |
| 6,636,803 B1 | 10/2003 | Hartz, Jr. et al. | |
| 6,640,185 B2 | 10/2003 | Yokota et al. | |
| 6,661,920 B1* | 12/2003 | Skinner | 382/187 |
| 6,674,414 B2 | 1/2004 | Saitou et al. | |
| 6,675,147 B1 | 1/2004 | Woestemeyer et al. | |
| 6,687,614 B2 | 2/2004 | Ihara et al. | |
| 6,714,220 B2* | 3/2004 | Sigl | 715/780 |
| 6,721,651 B1 | 4/2004 | Minelli | |
| 6,724,370 B2* | 4/2004 | Dutta et al. | 345/169 |
| 6,750,849 B2* | 6/2004 | Potkonen | 345/168 |
| 6,898,525 B1 | 5/2005 | Minelli | |
| 6,903,773 B1 | 6/2005 | Fushimoto | |
| 6,993,718 B2 | 1/2006 | Fujihara | |
| 7,030,863 B2* | 4/2006 | Longe et al. | 345/173 |
| 7,098,896 B2* | 8/2006 | Kushler et al. | 345/168 |
| 7,136,047 B2* | 11/2006 | Shimada et al. | 345/168 |
| 7,272,497 B2 | 9/2007 | Koshiji et al. | |
| 7,313,477 B1 | 12/2007 | Laverick et al. | |
| 7,336,263 B2* | 2/2008 | Valikangas | 345/173 |
| 7,366,609 B2 | 4/2008 | Lee | |
| 7,474,960 B1 | 1/2009 | Nesbitt | |
| 7,539,572 B2 | 5/2009 | Kamikawa et al. | |
| 7,546,188 B2* | 6/2009 | Nezu et al. | 701/36 |
| 7,737,951 B2* | 6/2010 | Pinkus et al. | 345/173 |
| 2001/0035880 A1* | 11/2001 | Musatov et al. | 345/764 |
| 2002/0061217 A1* | 5/2002 | Hillman et al. | 400/489 |
| 2002/0080123 A1 | 6/2002 | Kennedy | |
| 2002/0177944 A1* | 11/2002 | Ihara et al. | 701/208 |
| 2003/0036848 A1 | 2/2003 | Sheha | |
| 2003/0182052 A1 | 9/2003 | DeLorme et al. | |
| 2004/0039522 A1 | 2/2004 | Jwo | |
| 2004/0122674 A1 | 6/2004 | Bangalore et al. | |
| 2004/0203863 A1 | 10/2004 | Huomo | |
| 2004/0204845 A1 | 10/2004 | Wong | |
| 2005/0004746 A1 | 1/2005 | Morita et al. | |
| 2005/0140660 A1* | 6/2005 | Valikangas | 345/173 |
| 2006/0173615 A1* | 8/2006 | Pinkus et al. | 701/211 |
| 2007/0027628 A1 | 2/2007 | Geelen | |
| 2007/0087866 A1 | 4/2007 | Meadows et al. | |

FOREIGN PATENT DOCUMENTS

| | | |
|---|---|---|
| DE | 19753742 | 6/1999 |
| EP | 0918310 | 5/1999 |
| EP | 0927925 | 7/1999 |
| EP | 0929058 | 7/1999 |
| JP | 6068383 | 3/1994 |
| JP | 9152352 | 6/1997 |
| JP | 11-203046 | 7/1999 |
| KR | 2002-0014348 | 2/2002 |
| WO | WO 2004/076979 | 9/2004 |

OTHER PUBLICATIONS

Fitaly.Com Virtual Keyboard, http://www.fitaly.com/fitalyvirtualt3/fitalyvirtualannounce.htm, Wayback Machine archive.org: Fitaly.com Dec. 21, 2003 going back to Jan. 25, 1999.*

Garmin Corporation. StreetPilot GPS ColorMap—Owner's Manual. Updated Jun. 2000. Downloaded Sep. 11, 2008. http://www8.garmin.com/manuals/StreetPilotGPSColorMap_Ownersmanual.pdf.

Albinsson, P. and Zhai, S. 2003. High precision touch screen interaction. In Proceedings of the SIGCHI Conference on Human Factors in Computing Systems (Ft. Lauderdale, Florida, USA, Apr. 5-10, 2003). CHI '03. ACM, New York, NY, 105-112. DOI=http://doi.acm.org/10.1145/642611.642631.

Office Action for corresponding U.S. Appl. No. 11/276,555 dated Feb. 2, 2010.

Office Action for U.S. Appl. No. 11/276,555 dated Jul. 7, 2010.

Office Action for U.S. Appl. No. 11/276,560 dated Jul. 16, 2010.

Sherrod, Phil, "The Infiniti QX4 Navigation System Manufactured by Xanavi," Infiniti GPS Navigation System by Xanavi, pp. 1-5.

Garmin iQue 3600 Integrated Handheld Que Applications Guide (Manual); Jun. 2003, pp. 1-58.

Kenwood DVD Navigation System KNA-DV2100 Instruction Manual, Kenwood Corporation, 2002, pp. 1-49.

2000 I30/Q45 2001 QX4 Infiniti Navigation System Owner's Manual, May 2000.

* cited by examiner

NAVIGATION DEVICE WITH TOUCH SCREEN

CROSS REFERENCE TO RELATED APPLICATIONS

This application is a continuation of, and claims the priority of, pending U.S. application Ser. No. 10/546,741 filed on Aug. 25 2005 entitled "Navigation Device with Touch Screen", the contents of which are hereby incorporated by reference. The parent application claims the priority of PCT Application No. PCT/GB2004/000803 filed on Feb. 26, 2004; GB Patent Application No. 0304358.5 filed on Feb. 26, 2003; and, GB Patent Application No. 0305175.2 filed on Mar. 7, 2003, the entire contents of all of which are hereby incorporated in total by reference.

FIELD OF THE INVENTION

This invention relates to a touch screen controlled navigation devices that can display navigation data, and in particular in-car navigation system devices.

BACKGROUND OF THE INVENTION

GPS based devices are well known and are widely employed as in-car navigation systems. Reference may be made to the Navigator series software from the present assignee, TomTom B.V. This is software that, when running on a PDA (such as a Compaq iPaq) connected to an external GPS receiver, enables a user to input to the PDA a start and destination address. The software then calculates the best route between the two end-points and displays instructions on how to navigate that route. By using the positional information derived from the GPS receiver, the software can determine at regular intervals the position of the PDA (typically mounted on the dashboard of a vehicle) and can display the current position of the vehicle on a map and display (and speak) appropriate navigation instructions (e.g. 'turn left in 100 m'). Graphics depicting the actions to be accomplished (e.g. a left arrow indicating a left turn ahead) can be displayed in a status bar and also be superimposed over the applicable junctions/turnings etc in the roads shown in the map itself. Reference may also be made to devices that integrate a GPS receiver into a computing device programmed with a map database and that can generate navigation instructions on a display. The term 'navigation device' refers to a device that enables a user to navigate to a pre-defined destination. The device may have an internal system for receiving location data, such as a GPS receiver, or may merely be connectable to a receiver that can receive location data.

PDAs often employ touch screens to enable a user to select menu options or enter text/numbers using a virtual keyboard. Generally, touch input is meant to occur using a thin stylus since the size of individual virtual keys or other selectable items is relatively small. When navigating from a screen relating to one function or type of functions in an application to a different function or type of functions, then the presumption is that stylus selection of virtual keys, control panels, check boxes etc. will be undertaken since the related touch control zones are relatively small.

However, with some individual applications, such as a calculator application, each numeric may key be large enough to be selectable using a finger, as opposed to the stylus. However, where a large number of keys needs to be displayed at the same time (e.g. for a QWERTY or other format virtual keyboard with all alphabet letters), then a far smaller virtual keyboard has to be used; individual keys have then to be selected with the stylus. Hence, prior art devices may mix large, numeric keys available on one screen with much smaller keys on a different screen, even though the keys are of equal importance. Core functions cannot be said to be uniformly and consistently designed for effective and reliable finger operation, because the assumption is that users will operate a stylus on most occasions.

SUMMARY OF THE INVENTION

In a first aspect of this invention, there is a navigation device programmed with a map database and software that enables a route to be planned between two user-defined places.

The device may be further programmed to be able to display on a touch sensitive display a main navigation mode screen showing a map and to allow a user to input destination address information using a virtual keyboard whose keys are sized to allow reliable finger activation. This is especially advantageous for an in-car navigation device since it allows the user to easily and reliably enter address information, even whilst the device is mounted in position in a car.

These and other features of the invention will be more fully understood by references to the following drawings.

DETAILED DESCRIPTION

The present invention may be implemented in software from TomTom B.V. called Navigator. Navigator software runs on a touch screen (i.e. stylus controlled) Pocket PC powered PDA device, such as the Compaq iPaq. It provides a GPS based navigation system when the PDA is coupled with a GPS receiver. The combined PDA and GPS receiver system is designed to be used as an in-vehicle navigation system. The invention may also be implemented in any other arrangement of navigation device, such as one with an integral GPS receiver/computer/display, or a device designed for non-vehicle use (e.g. for walkers) or vehicles other than cars (e.g. aircraft). The navigation device may implement any kind of position sensing technology and is not limited to GPS; it can hence be implemented using other kinds of GNSS (global navigation satellite system) such as the European Galileo system. Equally, it is not limited to satellite based location/velocity systems but can equally be deployed using ground-based beacons or any other kind of system that enables the device to determine its geographic location.

Figure 1:
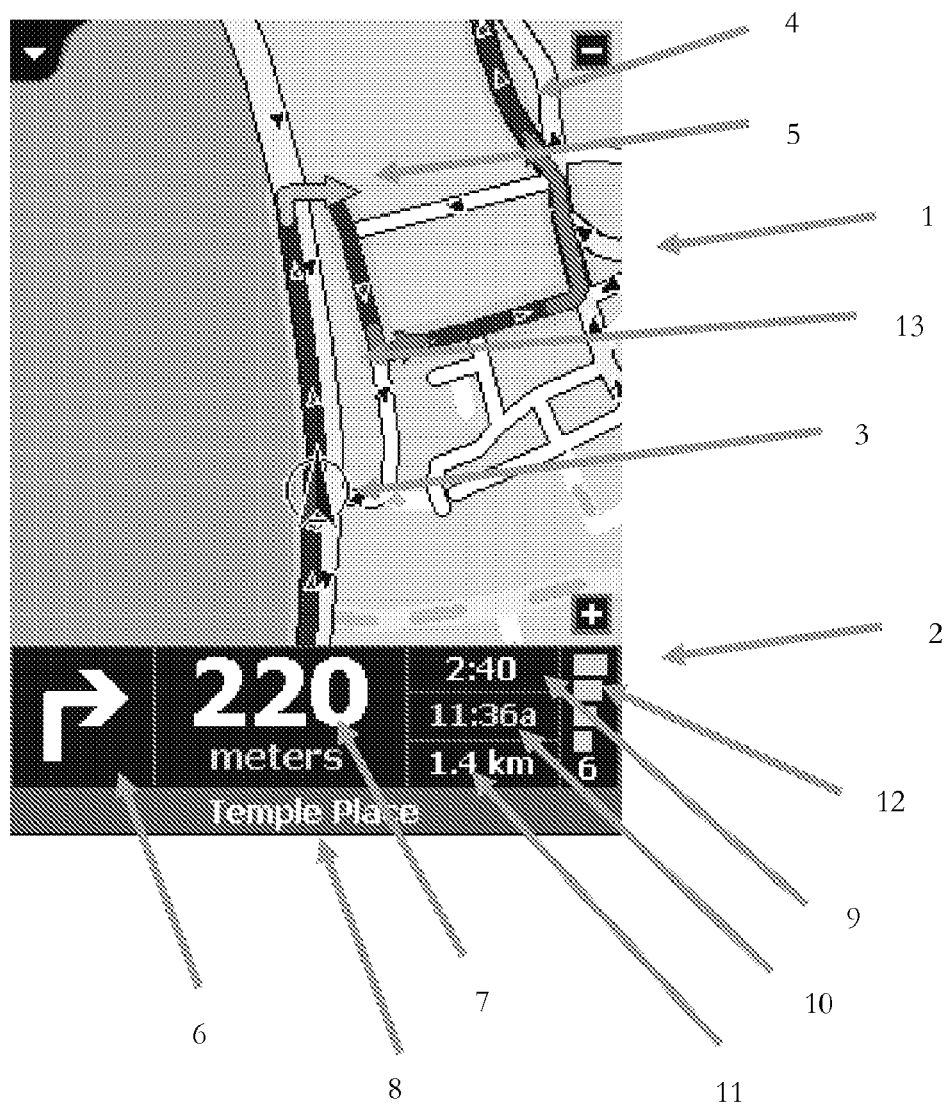
FIG. 1 is a screen shot from a navigation device implementing the present invention; the screen shot shows a plan map view and a status bar running along the bottom of the display.

Navigator software, when running on a PDA, results in a navigation device that causes the normal navigation mode screen shown in FIG. 1 to be displayed. This view provides driving instructions using a combination of text, symbols, voice guidance and a moving map. Key user interface elements are the following: a 2-D map 1 occupies most of the screen. The map shows the user's car and its immediate surroundings, rotated in such a way that the direction in which the car is moving is always "up". Running across the bottom quarter of the screen is the status bar 2. The current location of the device, as the device itself determines using conventional GPS location finding and its orientation (as inferred from its direction of travel) is depicted by an arrow 3. The route calculated by the device (using route calculation algorithms stored in device memory as applied to map data stored in a map database in device memory) is shown as darkened path 4 superimposed with arrows giving the travel direction. On the darkened path 4, all major actions (e.g. turning corners, crossroads, roundabouts etc.) are schematically depicted by arrows 5 overlaying the path 4. The status bar 2 also includes at its left hand side a schematic 6 depicting the next action (here, a right turn). The status bar 2 also shows the distance to the next action (i.e. the right turn—here the distance is 220 meters) as extracted from a database of the entire route calculated by the device (i.e. a list of all roads and related actions defining the route to be taken). Status bar 2 also shows the name of the current road 8, the estimated time before arrival 9 (here 2 minutes and 40 seconds), the actual estimated arrival time 10 (11.36 am) and the distance to the destination 11 (1.4 Km). The GPS signal strength is shown in a mobile-phone style signal strength indicator 12.

If the user touches the centre of the screen 13, then a navigation screen menu is displayed; from this menu, other core navigation functions within the Navigator application can be initiated or controlled. Allowing core navigation functions to be selected from a menu screen that is itself very readily called up (e.g. one step away from the map display to the menu screen) greatly simplifies the user interaction and makes it faster and easier.

Figure 3:
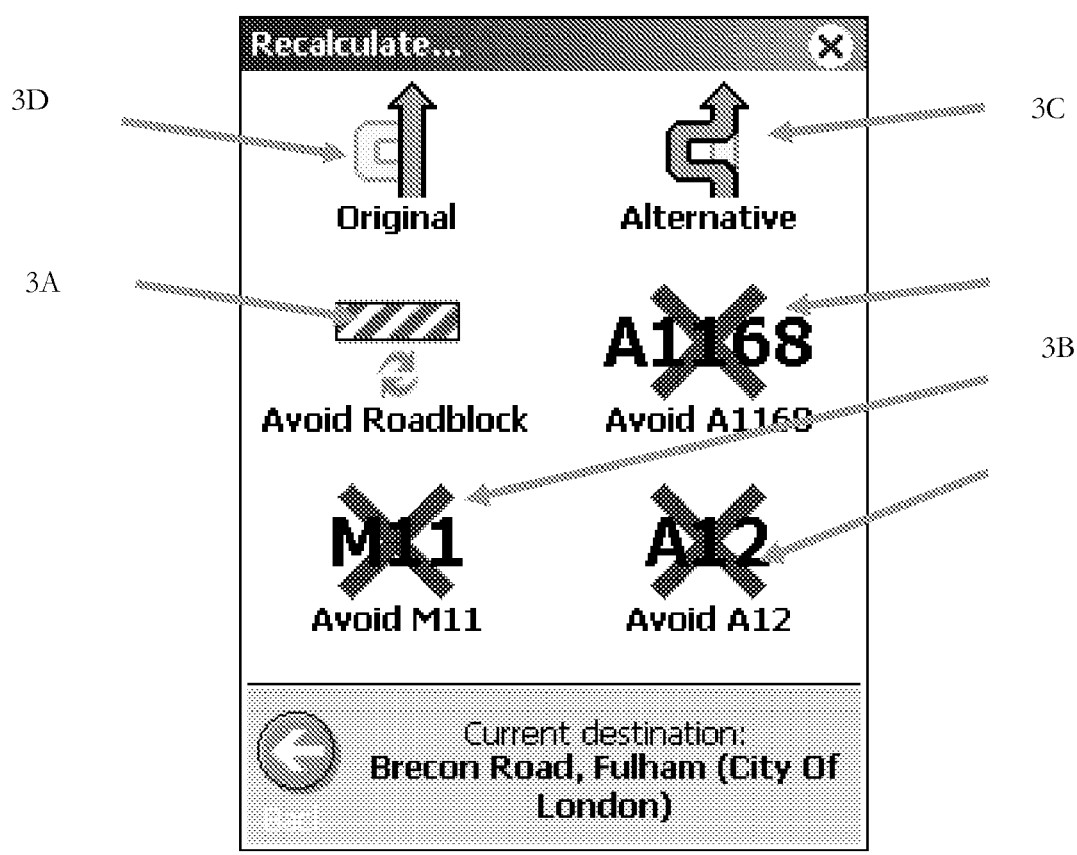
FIG. 3 is a screen shot from the navigation device showing various route planning functions that enable a user to require the device to plot a new route to the destination that (i) is an alternative route; (ii) avoids a roadblock immediately ahead; (iii) avoids predefined roads or (iv) is a reversion to the original route.

The area of the touch zone which needs to be touched by a user is far larger than in most stylus based touch screen systems. It is designed to be large enough to be reliable selected by a single finger without special accuracy; i.e. to mimic the real-life conditions for a driver when controlling a vehicle; he or she will have little time to look at a highly detailed screen with small control icons, and still less time to accurately press one of those small control icons. Hence, using a very large touch screen area associated with a given soft key (or hidden soft key, as in the centre of the screen 13) is a deliberate design feature of this implementation. Unlike other stylus based applications, this design feature is consistently deployed throughout Navigator to select core functions that are likely to be needed by a driver whilst actually driving. Hence, whenever the user is given the choice of selecting on-screen icons (e.g. control icons, or keys of a virtual keyboard to enter a destination address, for example), then the design of those icons/keys is kept simple and the associated touch screen zones is expanded to such a size that each icon/key can unambiguously be finger selected. In practice, the associated touch screen zone will be of the order of at least 0.7 cm$^2$ and will typically be a square zone. In normal navigation mode, the device displays a map. Touching the map (i.e. the touch sensitive display) once (or twice in a different implementation) near to the screen center (or any part of the screen in another implementation) will then call up a navigation menu (see FIG. 3) with large icons corresponding to various navigation functions, such as the option to calculate an alternative route, and re-calculate the route so as to avoid the next section of road (useful when faced with an obstruction or heavy congestion); or recalculate the route so as to avoid specific, listed roads.

The actual physical structure of the device itself may be fundamentally no different from any conventional handheld computer, other than the integral GPS receiver or a GPS data feed from an external GPS receiver. Hence, memory stores the route calculation algorithms, map database and user interface software; a microprocessor interprets and processes user input (e.g. using a device touch screen to input the start and destination addresses and all other control inputs) and deploys the route calculation algorithms to calculate the optimal route. 'Optimal' may refer to criteria such as shortest time or shortest distance, or some other user-related factors.

More specifically, the user inputs his start position and required destination in the normal manner into the Navigator software running on the PDA using a virtual keyboard. The user then selects the manner in which a travel route is calculated: various modes are offered, such as a 'fast' mode that calculates the route very rapidly, but the route might not be the shortest; a 'full' mode that looks at all possible routes and locates the shortest, but takes longer to calculate etc. Other options are possible, with a user defining a route that is scenic—e.g. passes the most POI (points of interest) marked as views of outstanding beauty, or passes the most POIs of possible interest to children or uses the fewest junctions etc.

Roads themselves are described in the map database that is part of Navigator (or is otherwise accessed by it) running on the PDA as lines—i.e. vectors (e.g. start point, end point, direction for a road, with an entire road being made up of many hundreds of such sections, each uniquely defined by start point/end point direction parameters). A map is then a set of such road vectors, plus points of interest (POIs), plus road names, plus other geographic features like park boundaries, river boundaries etc, all of which are defined in terms of vectors. All map features (e.g. road vectors, POIs etc.) are defined in a co-ordinate system that corresponds or relates to the GPS co-ordinate system, enabling a device's position as determined through a GPS system to be located onto the relevant road shown in a map.

Route calculation uses complex algorithms that are part of the Navigator software. The algorithms are applied to score large numbers of potential different routes. The Navigator software then evaluates them against the user defined criteria (or device defaults), such as a full mode scan, with scenic route, past museums, and no speed camera. The route which best meets the defined criteria is then calculated by a processor in the PDA and then stored in a database in RAM as a sequence of vectors, road names and actions to be done at vector end-points (e.g. corresponding to pre-determined distances along each road of the route, such as after 100 meters, turn left into street x).

Finger UI Design Approach

The present invention associates a touch activation zone for each of a core set of functions; this zone is large enough to be reliably selected by a single finger without special accuracy. This mimics the real-life conditions for a driver when controlling a vehicle; he or she will have little time to look at a highly detailed screen with small control icons, and still less time to accurately press one of those small control icons.

This UI design feature is consistently deployed throughout Navigator 2.0 in relation to all of the defined core functions and not just in an ad hoc manner where the screen design happens to permit a large control icon to be displayed: hence, whenever the user is given the choice of selecting certain on-screen options relating to core functions (e.g. control icons, or keys of a virtual keyboard to enter a destination address, for example), then the design of those icons/keys is kept simple and the associated touch screen zones is expanded to such a size that each icon/key can unambiguously be finger selected. Further, whenever a screen includes selectable graphical options (e.g. icons, names, check boxes etc.), then each of these options is linked to a non-overlapping touch input zone that is large enough to be reliably activated using a finger is displayed.

Hence, the device will not present to the user at different times a mix of selectable graphical options relating to core functions, some being large enough to be reliably activated with a finger and some being too small for that and requiring stylus activation. Key is that the user interaction design has been based on analysing what core functions might need to be activated by a driver whilst still driving and ensuring that these can be activated by selecting options (e.g. large graphical icons) linked to unusually large touch screen activation areas. Prior art approaches to UI design have failed to consistently identify core functions and treat them in this manner.

In practice, the associated touch screen zone will be a minimum of 0.7 cm$^2$ (far larger than normal touch screen activation zones) and will typically be square.

Examples of the core functions which consistently employ this approach are:

(i) moving between the highest level in the menu hierarchy to the next level down;

(ii) tasking away from the normal navigation mode screen;

(iii) selecting options that initiate route recalculation functions;

(iv) setting the current location as a location to be marked on a map.

Figure 2:
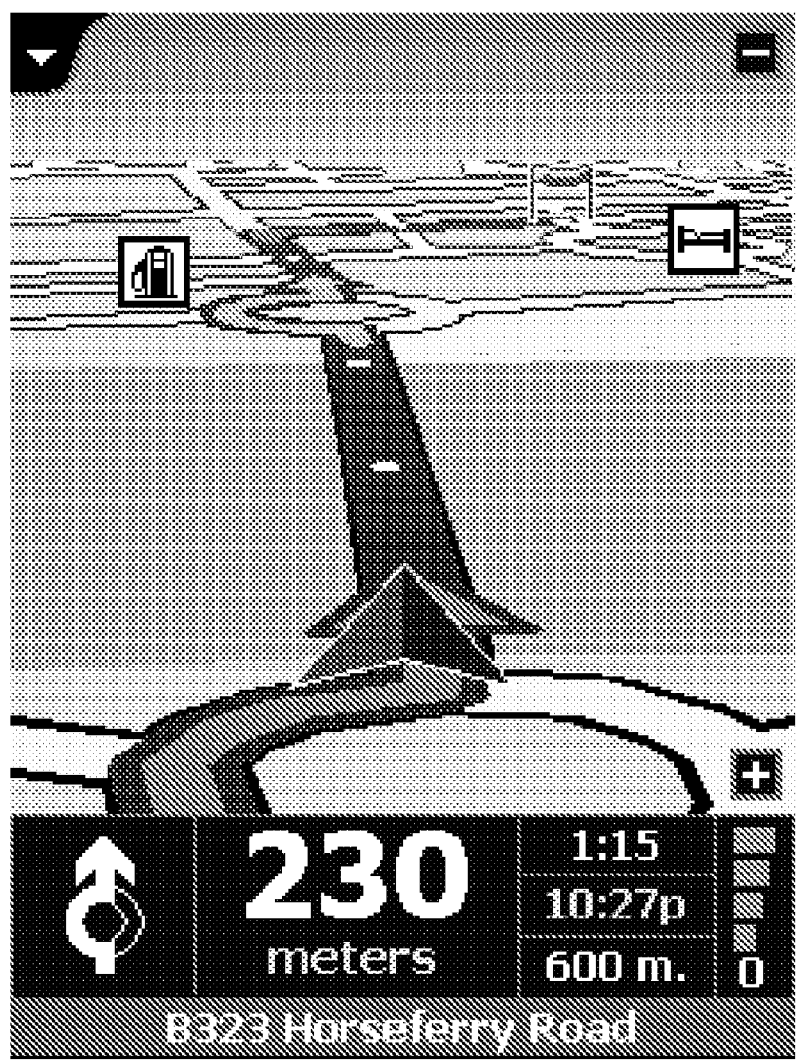
FIG. 2 is a screen shot from the navigation device implementing a 3-D view.

This approach can be illustrated in several contexts. First, to facilitate access to functions that enable alternative routes to be calculated by placing a menu of graphical icons for those functions (or any other kind of way or option to allow selection of the functions, such as lists, check boxes etc.) on a menu screen that is easily accessed from the main navigation screen—i.e. the screen that is displayed during actual or simulated/preview navigation (FIG. 1 or 2). As noted above, in normal navigation mode, the device displays an animated map that shows the location of the navigation device as the journey progresses. Touching the map (i.e. the touch sensitive display) once (or twice in a different implementation) near to the screen centre (or any part of the screen in another implementation) will then call up a Recalculate menu (see FIG. 3) with large icons corresponding to various route recalculation functions, such as the option to calculate an alternative route; re-calculate the route so as to avoid the next section of road (useful when faced with an obstruction or heavy congestion); and recalculate the route so as to avoid specific, listed roads. These alternative route functions are initiated by touching also the appropriate icon in the Recalculate menu screen (which is one user interaction, such as a screen touch, away from the normal mode navigation screen). Other route recalculation functions may be reached at a deeper level in the menu structure. However, all can be reached by selecting options such as graphical icons, lists, check boxes which are unambiguously associated with touch screen areas that are large enough to allow the user to select them with a fingertip whilst safely driving, typically at least 0.7 cm$^2$ in area.

Virtual Keyboard

Figure 4:
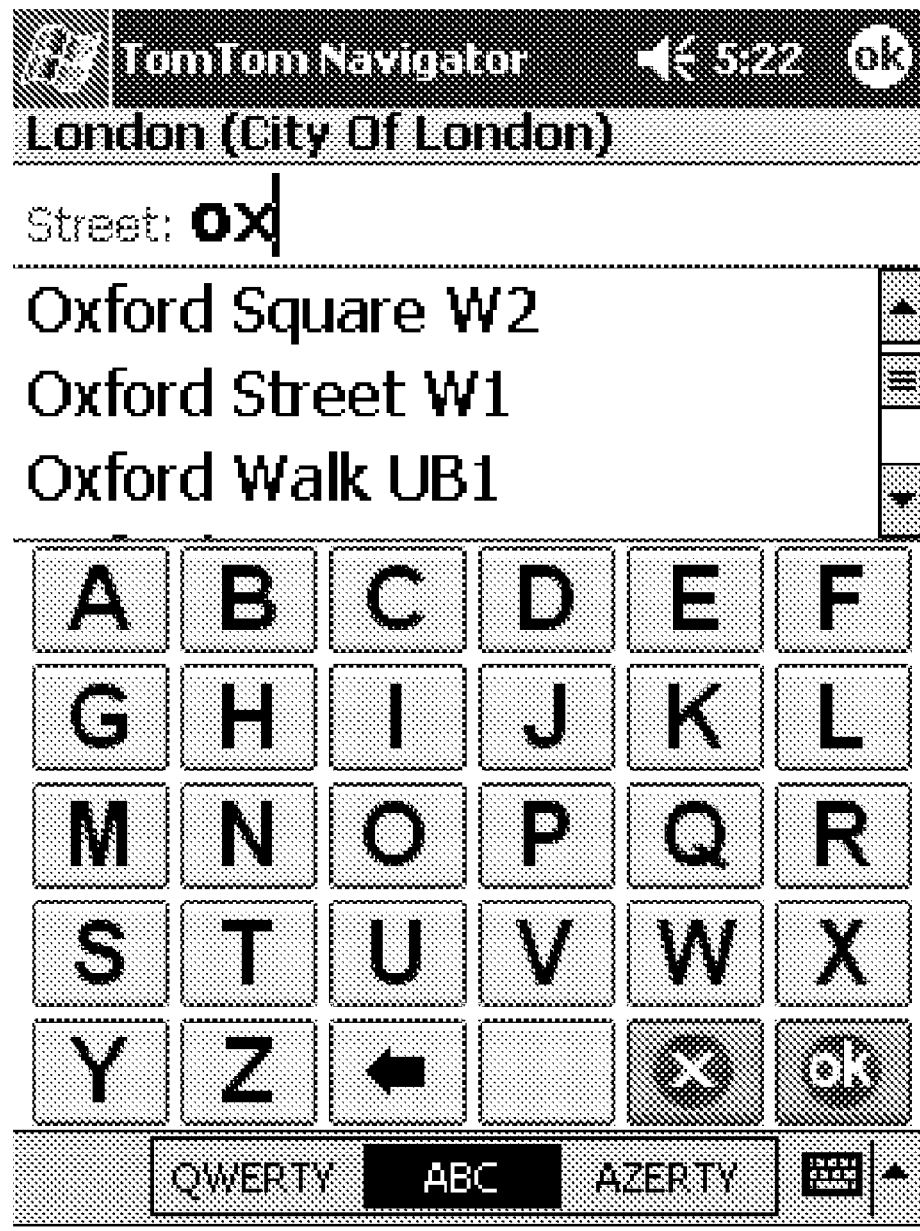
FIG. 4 is a screen shot from the navigation device showing a virtual ABCD format keyboard.

As noted above, a key feature is the use of large touch screen areas for each graphical icon that initiates a core function that a driver may need to deploy whilst driving. This approach is also used for the keys of the virtual keyboards as well (e.g. ABCD, as shown in FIG. 4, QWERTY etc formats). Because the device can display a large alphabet keyboard, far larger than conventional screen based keyboards on PDAs, this allows a user to input text more easily—and without taking the device out of the cradle or off the dashboard—and even using his finger rather than the stylus.

The optimal dimensions on a iPaq (with 240×320 pixels, or 106 pixels per inch, 48 pixels per cm) are:

QWERTY/AZERTY keyboard images:
Horizontal spacing: 25 pixels centre to centre (button to button)
Vertical spacing: 32 pixels centre to centre (button to button)
ABC keyboard image:
Horizontal spacing: 40 pixels centre to centre
Vertical spacing: 32 pixels centre to centre
NOTE: The numeric keyboard image is mixed (has both small and big keys). Also, some keys might be 1 pixel smaller in width than other keys (for aesthetics), therefore the centre to centre might be different from key to key.

The individual key size in pixels is (width, height):
36×28 (ABC keyboard image)
21×28 (QWERTY/AZERTY keyboard image)
46×28 (arrow keys on QWERTY/AZERTY keyboard images)
70×28 (space/back keys on QWERTY/AZERTY keyboard images)
NOTE: Some keys might be 1 pixel smaller in width than other keys (for aesthetics)

The total image sizes for different keyboards (width, height) are as follows:
240×155 (ABC keyboard image)
240×155 (QWERTY keyboard image)
240×155 (AZERTY keyboard image)
240×62 (2 line NUM/Arrowkeys image)
240×31 (1 line Arrow key image)
NOTE: This includes white-space edges in the range of 1 to 3 pixels.

The above sizes enable a soft keyboard to be displayed that a user can readily operate with one finger when the device is mounted on a dashboard cradle with the car being driven and without being significantly distracted from driving.

Tolerances to the above sizes are approximately 25% (plus or minus).

Waypoints

If the driver passes a location of interest on the route (e.g. while driving), he can store the present location by a very simple action, such as a rapid double tap in a pre-defined zone on the screen, such as a 0.7 cm$^2$ centered on the current vehicle location displayed by the device (or by issuing a voice command). This stores a marker in a database of waypoints; in essence the co-ordinates of the location of interest. This is another example of a core function (labeling the current location as a waypoint) that is activated using a touch screen area large enough to allow reliable finger selection even whilst the user is driving. The waypoint can be marked on the map itself with a POI (point of interest) icon. Later, the user can retrieve and use it (or even annotate and store it). For example, if marked as a POI on a map, the user could select the POI on the map, which would cause an annotation window to open, into which the user could input text (e.g. "great bookshop here").

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention

What is claimed is:

1. A navigation device, comprising:
a map database and software programmed in the navigation device, the software being configured to enable a route to be planned to a user input destination using map data stored in the navigation device, wherein the device is further programmed to display on a touch sensitive display a main navigation mode screen that shows, when in use, a map and a current location of the navigation device;

change the display to show a plurality of icons, belonging to a core set of functions including a function of selecting a virtual keyboard, with a respective non-overlapping touch input zone that is large enough to be reliably activated using a finger of a user; and to allow a user to input destination address information using a reconfigurable virtual keyboard whose key layout is reconfigurable to a plurality of different keyboard formats by selecting an icon representing a desired keyboard format, wherein the navigation device is a portable navigation device and the touch sensitive display is approximately the same size as a 3.5" display in a Pocket PC computer.

2. The device of claim 1 in which the device is configured to be mounted on a vehicle dashboard and the destination address information can be input to the virtual keyboard whilst the device is mounted on the dashboard.

3. The device of claim 1, wherein the virtual keyboard is reconfigurable to a QWERTY format keyboard.

4. The device of claim 1, wherein the virtual keyboard is reconfigurable to an AZERTY format keyboard.

5. The device of claim 4 in which the horizontal spacing of individual keys is 25 pixels center to center.

6. The device of claim 5 in which the vertical spacing of individual keys is 32 pixels center to center.

7. The device of claim 1, wherein the virtual keyboard is reconfigurable to an ABC format keyboard.

8. The device of claim 1 in which the horizontal spacing of individual keys is 40 pixels center to center.

9. The device of claim 8 in which the vertical spacing of individual keys is 32 pixels center to center.

10. The device of claim 1 in which the individual key size in pixels is, to an approximate 25% tolerance, selected from the following list:
    36×28 (ABC keyboard image)
    21×28 (QWERTY/AZERTY keyboard image)
    46×28 (arrow keys on QWERTY/AZERTY keyboard images) and
    70×28 (space/back keys on QWERTY/AZERTY keyboard images).

11. The device of claim 1 in which the total image sizes for different keyboards (width, height) are, to an approximate 25% tolerance, selected from the following list:
    240×155 (ABC keyboard image)
    240×155 (QWERTY keyboard image)
    240×155 (AZERTY keyboard image)
    240×62 (2 line NUM/Arrowkeys image)
    240×31 (1 line Arrow key image).

12. The device of claim 1, wherein the touch sensitive display displays the virtual keyboard, to allow the user to input destination address information using the virtual keyboard, subsequent to the user touching the main navigation mode screen.

13. A method of enabling a user to interact with a navigation device programmed with a map database and software that enables a route to be planned to a destination, the method comprising:

displaying on a touch sensitive display a main navigation mode screen showing a map using map data stored in the navigation device;

defining at least one core set of functions, including a function of selecting a virtual keyboard, performable by said navigation device;

associating each of the core set of functions with a respective non-overlapping touch input zone that is large enough to be reliably activated using a finger of a user; and allowing a user to input destination address information using a reconfigurable virtual keyboard whose key layout is reconfigurable to a plurality of different keyboard formats; and selecting a desired keyboard format by selecting an icon representing the desired keyboard format.

14. The method of claim 13 wherein the method further comprises a preparatory step of mounting the device on a vehicle dashboard, and then entering the destination address information to the virtual keyboard whilst the device is mounted on the dashboard.

15. The method of claim 14 wherein the selecting includes selecting an icon representing an AZERTY format keyboard.

16. The method of claim 14 wherein the selecting includes selecting an icon representing a QWERTY format keyboard.

17. The method of claim 14 wherein the horizontal spacing of individual keys is 25 pixels center to center.

18. The method of claim 17 wherein the vertical spacing of individual keys is 32 pixels center to center.

19. The method of claim 13 wherein the selecting includes selecting an icon representing an ABC format keyboard.

20. The method of claim 19 wherein the horizontal spacing of individual keys is 40 pixels center to center.

21. The method of claim 20 wherein the vertical spacing of individual keys is 32 pixels center to center.

22. The method of claim 13 wherein the individual key size in pixels is, to an approximate 25% tolerance, selected from the following list:
    36×28 (ABC keyboard image)
    21×28 (QWERTY/AZERTY keyboard image)
    46×28 (arrow keys on QWERTY/AZERTY keyboard images) and
    70×28 (space/back keys on QWERTY/AZERTY keyboard images).

23. The method of claim 13 wherein the total image sizes for different keyboards (width, height) are, to an approximate 25% tolerance, selected from the following list:
    240×155 (ABC keyboard image)
    240×155 (QWERTY keyboard image)
    240×155 (AZERTY keyboard image)
    240×62 (2 line NUM/Arrowkeys image)
    240×31 (1 line Arrow key image).

24. The method of claim 13, wherein the navigation device is a portable navigation device and the touch sensitive display is approximately the same size as a 3.5" display in a Pocket PC computer.

25. The method of claim 13, wherein prior to allowing the user to input destination address information using the virtual keyboard, the touch sensitive display displays the virtual keyboard in response to the user touching the main navigation mode screen.

26. A navigation device programmed with a map database and software that enables a route to be planned to a destination, the device comprising:

a touch sensitive display to display a main navigation mode screen showing a map, the touch sensitive display further being useable to change the display to show a plurality of icons on the touch sensitive display representing a set of core functions including at least a virtual keyboard having a plurality of selectable keyboard formats; and a processor to, in conjunction with the map database and software stored locally on the navigation device, recalculate the route in response to an input from the user using the virtual keyboard represented by one of the plurality of icons displayed on the touch sensitive display.

27. A method of enabling a user to interact with a navigation device programmed with a map database and software that enables a route to be planned to a destination, the method comprising:

displaying, on a touch sensitive display, a main navigation mode screen showing a map using map data stored in the navigation device;

changing the main navigation mode screen to a menu of plurality selectable icons;

displaying the plurality of icons on the touch sensitive display, at least one icon representing a virtual keyboard having a plurality of selectable keyboard formats, the icons being sized to allow reliable finger activation, in response to a user touching the icons;

displaying a virtual keyboard and inputting destination address text using the virtual keyboard and recalculating the route in response to the input user using the virtual keyboard represented by one of the plurality of icons displayed on the touch sensitive display.

* * * * *